United States Patent [19]

Derbowka

[11] Patent Number: 5,140,844
[45] Date of Patent: Aug. 25, 1992

[54] AIR BAG SENSOR THRUSTER FIXTURE

[75] Inventor: Victor R. Derbowka, Chatham, Canada

[73] Assignee: Siemens Automotive Limited, Chatham, Canada

[21] Appl. No.: 676,674

[22] Filed: Mar. 28, 1991

[51] Int. Cl.$^5$ .............................................. G01M 7/00
[52] U.S. Cl. ................................................... 73/1 D
[58] Field of Search .................. 73/1 D, 2, 663, 865.3

[56] References Cited

U.S. PATENT DOCUMENTS

| | | | |
|---|---|---|---|
| 3,350,916 | 11/1967 | Bock | 73/1 D |
| 3,670,563 | 6/1972 | Light | 73/663 |
| 4,428,224 | 1/1984 | Farazi et al. | 73/2 |
| 4,586,377 | 5/1986 | Schmid | 73/1 D |
| 4,895,021 | 1/1990 | Ishizeki | 73/2 |
| 4,912,980 | 4/1990 | Baughn | 73/663 |

Primary Examiner—Hezron E. Williams
Assistant Examiner—Howard Wisnia
Attorney, Agent, or Firm—George L. Boller; Russel C. Wells

[57] ABSTRACT

A testing fixture for use on a thruster machine for the purposes of testing ball and tube supplemental inflatable sensors for use in air bag applications for motor vehicles. The fixture is fabricated from light weight materials and has clamp 30 fabricated from resilient materials so as to locate and holding the sensors in place. Pneumatic tightening provides a torquing limit on the clamp to ensure that the desired clamping force is maintained regardless of the wear of the clamp 30.

9 Claims, 3 Drawing Sheets

AIR BAG SENSOR THRUSTER FIXTURE

This invention relates to a testing fixture in general and more particularly to a testing fixture for use on a thruster machine for the purposes of testing ball and tube supplemental inflatable sensors for use in air bag applications for motor vehicles.

BACKGROUND OF THE INVENTION

1. Prior Art

Supplemental inflatable restraint ("SIR") sensors are positioned on motor vehicles and are responsive to the application of high impulse forces to initiate the deployment of air bags. In particular, in a majority of the motor vehicles at this time, there are one or more sensors placed at the very front of the vehicle, in as far forward a position as possible, to sense the application of an unusually high impact force such as that found when the front of the vehicle is involved in a crash. Another sensor may be typically placed on the firewall of the vehicle at the end of the engine compartment to sense the force application at that point. In such a system, both front sensors are electrically connected in parallel and then in series with the rearward sensor and one of the front and rearward sensors must be actuated substantially simultaneously in order for the air bag to be deployed.

Each motor vehicle platform has different characteristics for the transmittal of forces from the front of the vehicle to the passenger compartment. That is, the force necessary to deploy the air bag in small, light vehicles may be less than in larger, heavier vehicles. These forces are correlated to acceleration magnitudes of the vehicle. Typically when a motor vehicle is involved in a frontal crash, the acceleration of the vehicle as it stops is a function of the force being applied to the vehicle. Each sensor must respond to a designed acceleration pulse and must not respond to forces that are less both in time and amplitude.

When SIR sensors are manufactured, the force or acceleration response is designed into the sensor so that the sensor responds to a particular acceleration characteristic and does not respond to other acceleration characteristics. Once the sensor is manufactured, it is tested to determine that it meets the requirements.

Prior art testers are single sensor testers wherein one sensor is clamped into a particular position in a fixture and the testing acceleration characteristics are applied. The fixture is secured to a cross roller slide on a table of a thruster machine. The thruster machine operates to move the table in one direction at a high velocity and then reverses movement to get an acceleration signal. The single sensor must operate above one range and not operate below a lower range with a tolerance range therebetween where the sensor may or may not actuate. The ranges are different for sensors for different vehicle platforms. The mass of the slide, fixture and sensor device is limited by the operation specifications of the thruster machine. If the mass is too high, the acceleration pulses will not be correct and potentially good sensors will appear to be bad sensor. This error will not elevate a bad sensor to be a good sensor.

An example of such a sensor is that found in U.S. Pat. No. 4,329,549.

SUMMARY OF INVENTION

It is a principal advantage of this testing fixture to provide the means to test more than one sensor at a time.

It is another advantage of this testing fixture to accurately locate the sensor relative to the direction of the applied force.

It is yet another advantage of this testing fixture to reduce the weight of the fixture to a level that allows multiple sensor testing without impairing the force output of the testing machine or thruster.

In accordance with these and other advantages, there is described an air bag sensor thruster fixture for acceleration testing of a plurality of electrical air bag sensors during a single testing operation.

The fixture comprises a base plate adapted to be mounted on a cross slide on a platform on the thruster machine. Means including locating pins and blocks, are connected to the base plate to locate the sensors to be tested in a predetermined orientation relative to the direction of the velocity applied by the thruster machine. Clamping means for each sensor is secured to the base plate and operatively coupled to the locating means. The clamping means includes a first or wedge-shaped resilient member for locating each sensor substantially parallel to the base plate and a second or pad-shaped resilient member to secure the sensor to the base plate by the application of a pressure force substantially normal to the base plate. The clamping means is sequentially moved into position by a torque means from a non-clamping position to a clamping position to have the wedge-shaped member engage the sensors initially to locate the sensors and the pad-shaped member to engage the located sensor to apply the substantially normal force thereto. The fixture provides electrical receptacle means for receiving the connector from the sensor so that electrical signals are sent to and received from the sensor to indicate the operation of the sensor during the application of the thrust forces from the machine.

The wedge-shaped member is fabricated from a resilient material that will upon initial contact with the sensor apply a longitudinally directed force to move the sensor against fixed locating members secured to the base plate and then deform when in contact with the sensors as the sensors are restrained by the fixed members.

The pad-shaped member is fabricated from a resilient material that will upon initial contact with the sensors apply a substantially normally transversely directed force with reference to the base plate to move the sensor against the base plate and then the pad will deform as the pressure continues to be applied.

The clamping member is moved into position by means of pneumatic tool that moves a threaded member operatively coupled to the clamping member along a threaded post secured to the base plate. The clamping member is operable to first apply the wedge-shaped member and then the pad-shaped member to the sensors under test.

When the testing is completed, the pneumatic tool operates to move the clamping member from the clamping position to the non-clamping position so to allow the sensors to be removed from the fixture.

DESCRIPTION OF THE DRAWINGS

These and other objects and advantages are described in the following drawings and description of the preferred embodiment. In the drawings.

DETAILED DESCRIPTION OF THE PREFERRED EMBODIMENT

Figure 1:
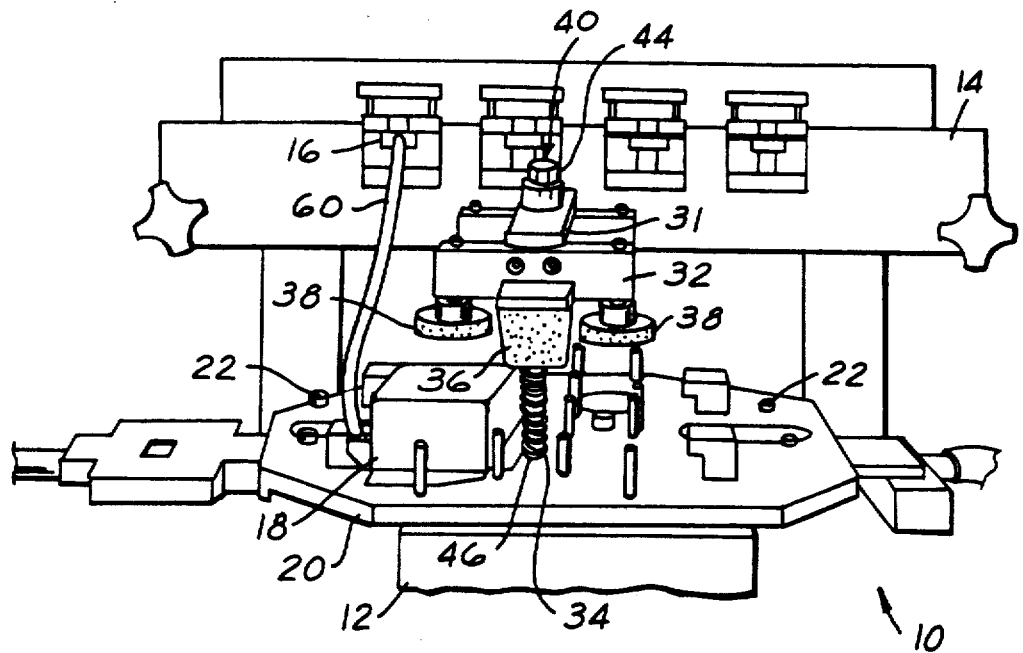
FIG. 1 is a perspective view of the fixture mounted on the table of the thruster machine and illustrates one sensor.

In FIG. 1, the air bag sensor thruster fixture 10 is shown secured to the cross roller slide on a mounting plate of a thruster machine. The thruster machine is similar to that manufactured by UNHOLTZ DICKIE under the model number 6X and is not shown. Mounted on or adjacent to the thruster machine and rearward with respect to FIG. 1 is a receptacle means 14 for receiving and connecting the connectors 16 from each of the sensors 18 mounted on the fixture 10.

The fixture has a base plate 20, attaching means 22 illustrated as threaded members for attaching the base plate to the roller cross slide 12 on the plate of the thruster machine, locating means 24, 26 connected to the base plate 20 for locating each of the sensors 18 in a predetermined orientation relative to the direction 28 of the velocity applied by the thruster machine, and clamping means 30 threadably mounted to a post secured to the base plate. The clamping means 30 including a first resilient means 36 and a second resilient means 38 secured to the clamping arms 31, 32 and adjustable means 40 for moving the clamping means 30 in a direction normal to the base plate 20.

Figure 2:
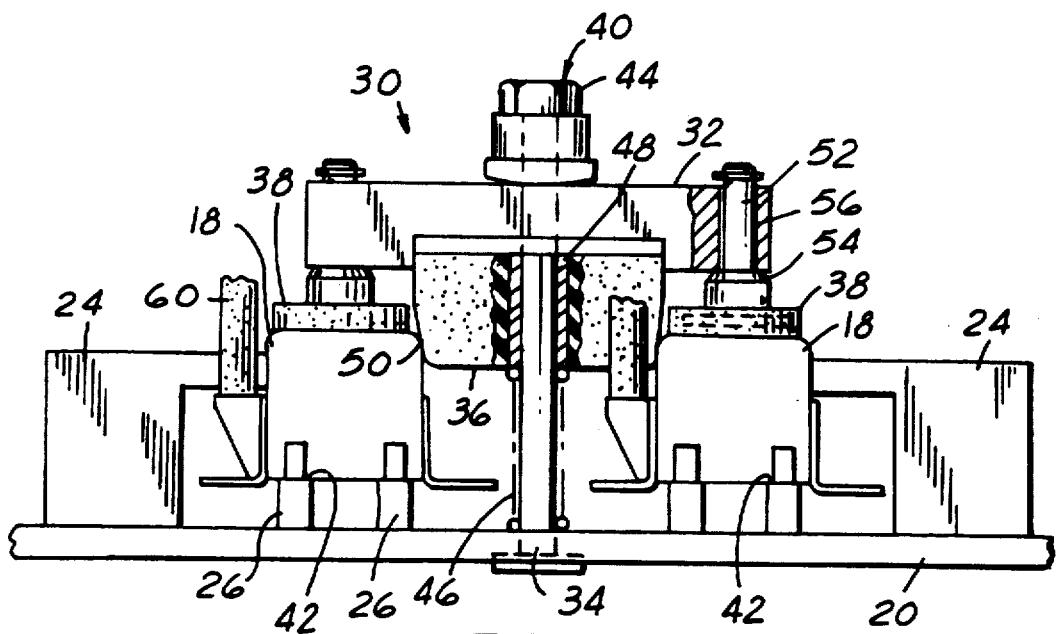
FIG. 2 is a front view of the fixture of FIG. 1.
Figure 3:
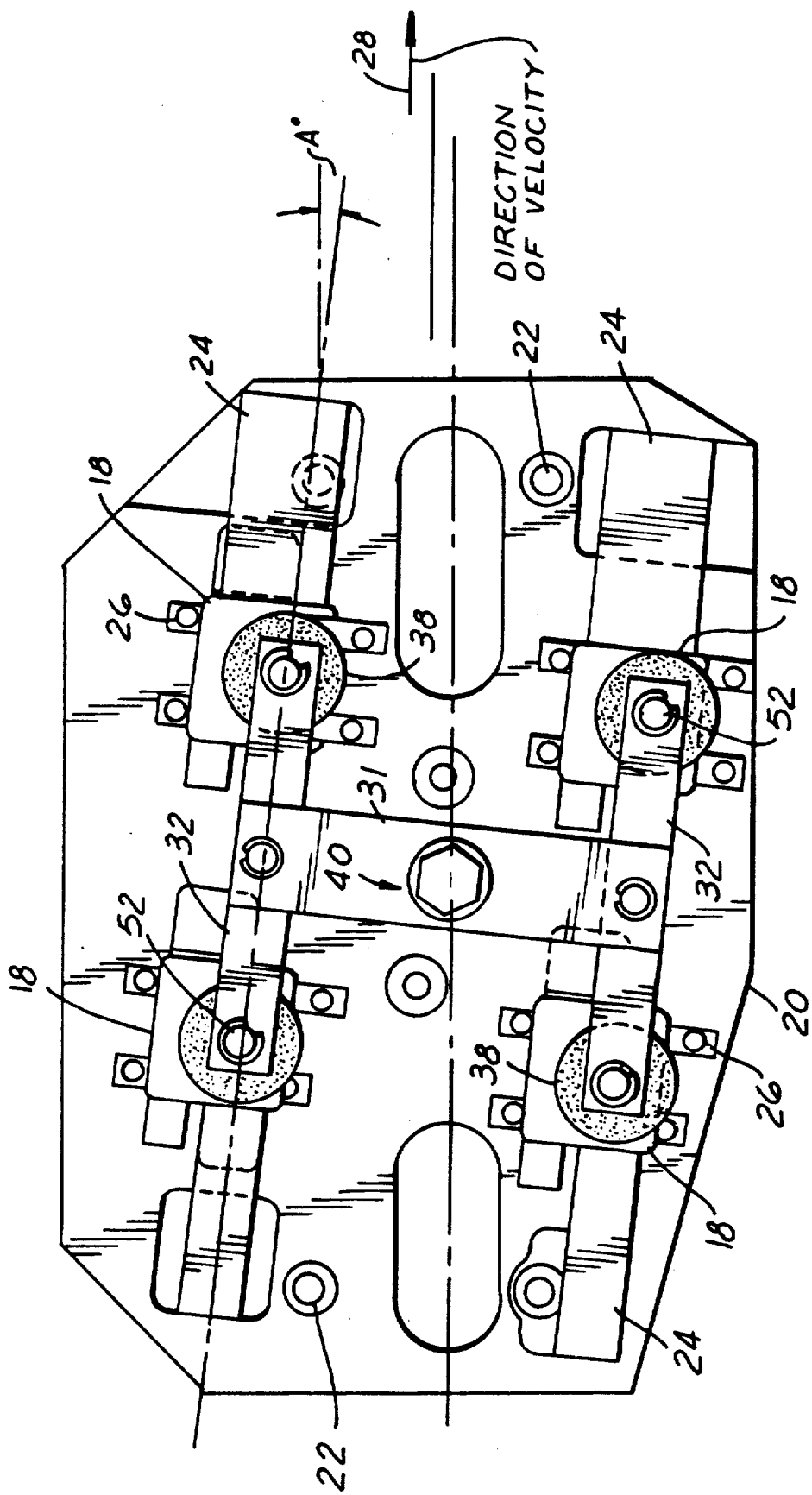
FIG. 3 a plan view of the fixture of FIG. 1 illustrating four sensors secured to the fixture.
Figure 4:
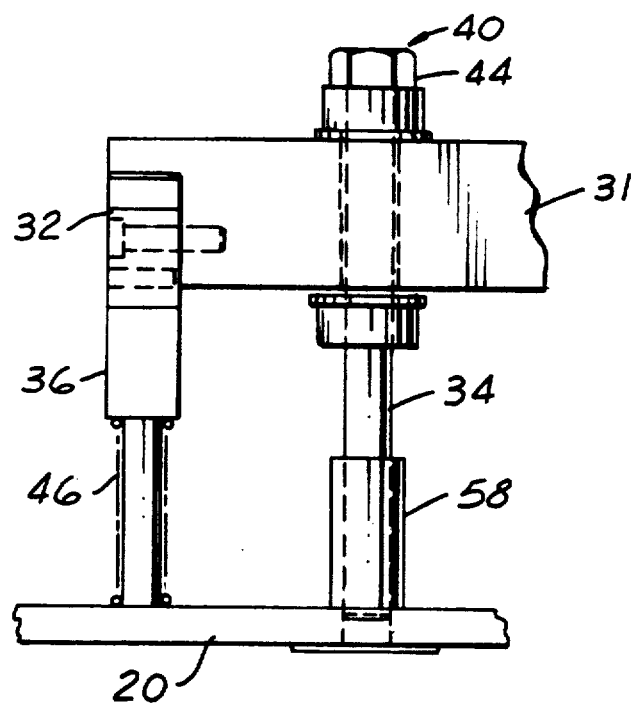
FIG. 4 is a section view in elevation showing the structure of the clamping means.

FIG. 2 illustrates the clamping means 30 in its clamping position to locate and secure a pair of sensors 18 to the fixture 10. Each sensor 18 is mounted on a plurality of dowel pins 26 having a shoulder 42 to hold the sensor 18 off of the surface of the base plate 20. Each sensor 18 is located in a direction parallel to the base plate by means of fixedly located locator block 24. The clamping means 30 is lowered into place by an adjustable means 40 that is a hexagonal or of a nut-shaped member 44 being threaded on a threaded post 34 secured to the base plate 20. In the alternative, the adjustable means 30 is a hexagonal shaped threaded member adapted to operated by a pneumatic means, not shown. As the nut-shaped member 44 is turned, the clamping means 30 is moved against a bias means 46. The bias means 46 bears against an insert 48 in the wedge shaped-member 36 and tends to restrict its downward movement and to keep the wedge-shaped member 36 against the cross arm 32. As the wedge-shaped member 36, which has tapered surfaces 50, contacts the sensors 18, the downward force from the clamping means 30 is applied by the tapered surfaces 50 to the sensors. This force causes the sensors 18 to move against the locator blocks 24. As the clamping means 30 moves against the bias means 46, the pad-shaped members 38 are bearing against the top or upper surface of the sensors 18 applying a force normal to the sensors 18 to hold the sensors against the base plate 20. The timing sequence of the clamping means 30 is such that the wedged-shaped member 36 moves the sensors 18 against the locator blocks 24 before there is any substantial force applied by the pad-shaped members 38.

The pad-shaped members 36 are secured to cylindrical shaped members or posts 52 which are slidably mounted in cross arms 32 of the clamping means 30. The posts 52 have a spherical-shaped shoulder 54 which limits the vertical movement of the post 52 in the bushing 56 as the clamping means 30 is moved downward under the force of the nut-shaped member 44. The spherical shaped shoulder 54 cooperating with the clearance in the bushing 56 between the post 52 and the inner diameter of the bushing, allows the pad-shaped member 38 to seat "flat" on the sensor 18. When the wedged shaped member 36 has moved the sensors 18 against the locator blocks 24, the shoulders 54 on the posts 52 engage the lower surface of the cross arms 32. Continued downward movement of the clamping means 30 applies a normal force to the sensor 18 through the pad-shaped members 38.

The nut-shaped member 44 is driven by a pneumatic wrench, not shown, so that when a desired torque is reached, the wrench will release and the clamping means 30 will not apply any more force to the sensor 18 by either the wedge-shaped 36 or pad-shaped 38 members. Thus, the clamping means 30 is automatically adjusted for wear of either the wedge-shaped member 36 or the pad-shaped member 38. This is contrary to the use of manual clamping members found in previous fixtures.

In the particular embodiment, the fixture 10 has the capacity for four sensors 18 to be tested at the same time. To accommodate the four sensors the clamping means 30 has a pair of cross arms 32 connected by a bridge arm 31. The center of the bridge arm 31 has a clearance hole through which the threaded post 34 is located. The threaded post is threaded into the base plate 20 and nut-shaped member 44 is threaded on the end extending through the bridge arm 31. As the nut-shaped member 44 is turned on the threaded post 34, the bridge arm 31 is moved along the threaded post.

In the alternative, the nut-shaped member 44 and the threaded post may be a hex-head screw which is secured in the base plate 20 of the fixture 10. As the torque wrench turns the hex head, the screw is treaded into the base plate 20 or into a post 58 extending from the base plate 20 operating to lower the clamping means 30 to the clamping position. When the torque wrench turns the hex head 41 in the opposite direction, the bias means 46 functions to raise the clamping means 30 to the non-clamping position to allow the sensors 18 to be removed.

When the sensors 18 are placed on the fixture 10 and at some time before the testing is begun, the connectors 16 on the end of the cables 60 from each sensor 18 are connected to the respective sockets on the receptacle means 14. It is by the supplying of an electrical signal to the sensor 18 and the receipt of an electrical signal, that the sensor is tested.

After the sensors 18 have been secured, the connectors 16 plugged into the receptacle means 14, a computer program operates the thruster machine to move the cross roller slide 12 in one direction 28 at a given velocity and then reverse the direction. At the reversal, the acceleration component of the velocity is generated and the ball element of the sensor 18 is moved along its tube. If the acceleration is above a certain value, the ball must make contact with a pair of electrical contacts in the sensor thereby closing an electrical circuit. If the acceleration is below a certain value, the ball must not make contact with the electrical contacts in the sensor. As previously indicated, for each particular model of the sensor, the acceleration values are different.

The characteristics of the SIR sensors as used in the fixture are such that the acceleration of the thruster table is applied to the sensor at a predetermine angle A° from the axis of the sensor 18. This angle A° is built into the fixture by the appropriate orientation of the dowel pins 26 and locator blocks 24 for each sensor 18 and in the preferred embodiment this is at an angle of six degrees to the direction of the velocity applied by the thruster. The wedge-shaped member 36 functions to make sure that the sensor is properly positioned with reference the locator blocks 24 and the dowel pins 26, thus assuring the correct orientation of the acceleration pulse to each sensor.

The clamping means 30, in the present embodiment, operates to hold the sensors from any movement during the approximately 80 g's of thrust force.

The wedge-shaped member 36 is a molded member molded from urethane having an eighty durometer. The pad-shaped member 38 is molded from a material having a ninety durometer. By use of these two materials, the application of the two members 36 and 38 to the sensors 18 is such that the surface of the sensor housings are not scratched or damaged, but the sensors are secured to the fixture.

The various elements of the fixture 10 are all fabricated from a light weight material or metal such as aluminum, urethane, etc. in order to keep the mass of the fixture 10 at a low value. The low value is necessary for the calibration and operation of the thruster machine.

What is claimed is:

1. An air bag sensor thruster fixture for acceleration testing of a plurality of electrical sensors on across roller slide member of a thruster machine, the fixture comprising:
   a base plate adapted to be mounted on the cross roller slide member of the thruster machine;
   locating means connected to said base plate for locating each of the sensors in a predetermine orientation relative to the direction of the acceleration applied by the thruster machine;
   clamping means operatively connected to said base plate and operatively coupled to said locating means for applying clamping force to independently hold each of the sensors relatively to their respective locating means;
   said clamping means including a first resilient member for bearing against a predetermined number of sensors to apply a force substantially parallel to said base plate for holding the sensors relative to said locating means and a second resilient member for each of the sensors for applying a force substantially normal to said base plate for holding the sensors relative to said locating means and against said base plate, wherein said clamping means is operable to sequentially apply said substantially parallel force from said first resilient member against the sensors before applying said substantially normal force from said second resilient member against the sensors;
   torque means for moving said clamping means between a non-clamping position and a clamping position; and
   receptacle means for connecting each of the sensors for receiving electrical test signals.

2. An air bag sensor thruster fixture for acceleration testing of a plurality of electrical sensors on across slide member of a thruster machine according to claim 1 wherein said base member, locating means and said clamping means are fabricated from a light weight material such as aluminum for reducing the mass of the fixture.

3. An air bag sensor thruster fixture for acceleration testing of a plurality of electrical sensors on a cross slide member of a thruster machine according to claim 1, wherein said resilient member is fabricated from a urethane material.

4. An air bag sensor thruster fixture for acceleration testing of a plurality of electrical sensors on a cross slide member of a thruster machine according to claim 1, additionally including bias means operative connected between said base plate and said first resilient means for biasing said first resilient means against said clamping means in said non-clamping position.

5. An air bag sensor thruster fixture for acceleration testing of a plurality of electrical sensors on a cross slide member of a thruster machine according to claim 1, wherein said torque means is a member having an hexagonal shaped one end and a cylindrical-shaped threaded member at the other end adapted to operated by a pneumatic means.

6. An air bag sensor thruster fixture for acceleration testing of a plurality of electrical sensors on a cross slide member of a thruster machine according to claim 5, wherein said pneumatic means is operable to apply a predetermined torque to said torque means when said clamping means is in said clamping position.

7. An air bag sensor thruster fixture for acceleration testing of a plurality of electrical sensors on a cross slide member of a thruster machine according to claim 1, wherein said receptacle means for connecting each of the sensors for receiving electrical test signals is a plurality of socket members, one for each of the electrical sensors adapted to respectively receive the electric wires from the electrical sensors.

8. An air bag sensor thruster fixture for acceleration testing of a plurality of electrical sensors on a cross slide member of a thruster machine according to claim 1, wherein said locating means locates each of the sensors at a predetermined angle relative to the direction of acceleration applied by the thrust machine.

9. An air bag sensor thruster fixture for acceleration testing of a plurality of electrical sensors on a cross slide member of a thruster machine according to claim 8, wherein said predetermined angle is substantially six degrees.

* * * * *